A. TURNBULL.

Door Bell.

No. 3,439.

Reissued May 18, 1869.

Witnesses:
Theo Tusch
Wm Brown

Inventor:
A Turnbull
By Munn & Co
Attys.

N. PETERS, Photo-Lithographer, Washington, D. C.

UNITED STATES PATENT OFFICE.

P. & F. CORBIN, (A JOINT STOCK CORPORATION,) OF NEW BRITAIN, CONNECTICUT, ASSIGNEES OF ANDREW TURNBULL.

IMPROVED DOOR-BELL.

Specification forming part of Letters Patent No. 48,242, dated June 13, 1865; Reissue No. 3,439, dated May 18, 1869.

*To all whom it may concern:*

Be it known that ANDREW TURNBULL, of New Britain, in the county of Hartford and State of Connecticut, did invent a new and useful Improvement in House Door-Bells; and the following is hereby declared to be a full, clear, and exact description thereof, which will enable those skilled in the art to make and use the same, reference being had to the accompanying drawings, forming part of this specification, in which—

Figure 1:
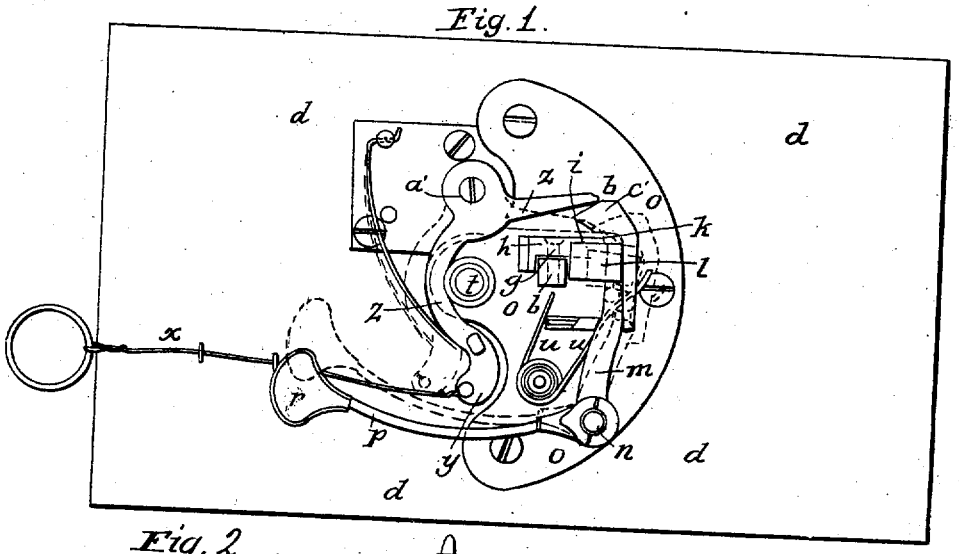
Figure 2:
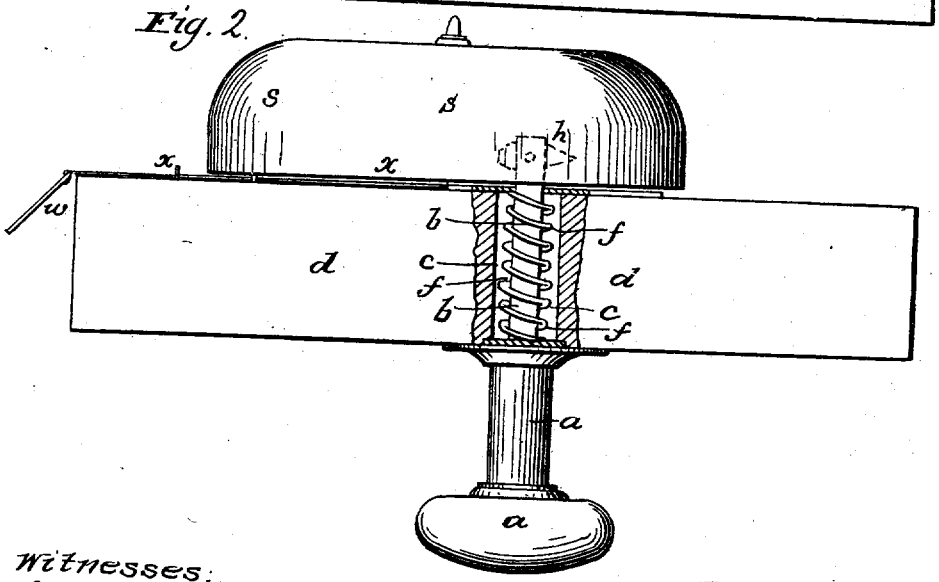

Figure 1 is a plan of the mechanical devices used for operating the hammer of the bell. Fig. 2 is a side view of a bell, showing the part of the door in which the shank of the handle is inserted in section.

Similar letters of reference indicate corresponding parts.

This invention relates to a door-bell in which the hammer of the bell is operated in drawing out the handle or pull, and also in pushing the same in or allowing it to return to a normal position.

*a a* in the drawings represent the handle or pull fastened to a square shank, *b*, extending through a proper-shaped opening, *c*, in the door *d* or other place to which the bell is to be applied, the handle being fastened in any ordinary manner.

*f* is a helical spring around the shank *b* of the handle, which, when the handle has been drawn out to ring the bell, (as will be presently described,) retracts the same.

On the inner end of the shank *b* and hung on a pivot or fulcrum, *g*, thereof is a cam, *h*, made in the shape of a wedge at one end, and this is in the proper position for pressing back the end *l* of a bent or angular lever, *m*. This lever *m* is on a fulcrum, *n*, projecting from the bed-plate *o* on the door or support *d*. The bent or angular lever *m* is fitted with an arm, *p*, and hammer-head *r*, for striking the inner surface of a gong or bell, *s*, sustained by a fixed stud, *t*, of the bed-plate *o*. On pulling the handle out, its cam-piece *h*, by bearing upon the inner end, *l*, of the bent or angular lever *m*, causes the same to turn on its fulcrum, thus moving back the hammer from its bell until the cam *h* has passed entirely by the end of the lever *m*, when the hammer is thrown by the force of the spring *u* against the bell, ringing the same, the position of the parts previous to the ringing of the bell being represented by red lines in Fig. 1. The handle-shank being forced back to its original position against the door or support by its spring *f*, the cam-piece *h* passes against the inner arm of the hammer-lever, but this time in an opposite direction, and again causing the hammer to ring the bell.

The cam-piece *h*, being hung on the fulcrum *g*, has a small amount of swinging movement allowed to it in consequence of the tail-piece 3 acting as a stop against the side of the shank *b*, so that when the point of the wedge-shaped cam *h* passes the part *l* of the lever *m*, said cam *h* is free to swing out of the way of the portion *l* of the lever *m*, so as not to obstruct the sudden blow on the bell as the lever *m* and incline *l* return to a normal position.

From the above description it is apparent that by one pull on the handle the bell is rung twice—first, by its outward movement, and, second, by its inner movement, caused by the force of the spring attached to the handle, as described, the advantages of which are evident.

In lieu of operating the hammer for striking the bell directly by the parts described, the bell can be placed at any desired position or place, it being only necessary to connect the bent or angular lever with the same by means of any suitable connecting-rod.

Another but substantially similar mode of giving the hammer a double movement against the bell by one pull of the bell-handle is shown also in the drawings, and consists in connecting the handle (represented by a ring, *w*, therein) to one end of a rod, *x*, connecting the same with the end *y* of a bent or angular spring-lever, *z*, turning on a fulcrum at *a'*, the cam end *b'* acting upon the inclined end *c'* of the hammer-lever arm, causing the hammer to strike twice, as aforesaid.

No claim is made for giving two strokes on the bell with one pull, nor for a pivoted cam or catch.

What is claimed, and desired to be secured by Letters Patent, is—

A pivoted or swinging cam-piece, in combination with the hammer and bell, when said cam-piece produces a positive motion of the hammer by movement in each direction, substantially as set forth.

Dated this 6th day of March, A. D. 1869.

F. H. NORTH,
*President.*

CHARLES PECK,
*Secretary.*

Witnesses:
EDWD. L. PRIOR,
WM. C. WALKER.